United States Patent
Pasquier et al.

(10) Patent No.: US 8,383,555 B2
(45) Date of Patent: *Feb. 26, 2013

(54) WELL FLUID COMPRISING A FLUORINATED LIQUID PHASE

(75) Inventors: David Pasquier, Billancourt (FR); Alain Driancourt, L'Hay les Roses (FR); Annie Audibert, Croissy sur Seine (FR)

(73) Assignee: Institut Francais du Petrole, Cedex (FR)

( * ) Notice: Subject to any disclaimer, the term of this patent is extended or adjusted under 35 U.S.C. 154(b) by 0 days.

This patent is subject to a terminal disclaimer.

(21) Appl. No.: 12/857,596

(22) Filed: Aug. 17, 2010

(65) Prior Publication Data

US 2010/0307831 A1    Dec. 9, 2010

Related U.S. Application Data

(63) Continuation of application No. 11/561,094, filed on Nov. 17, 2006, now Pat. No. 7,858,564.

(30) Foreign Application Priority Data

Nov. 18, 2005  (FR) ..................... 05 11694

(51) Int. Cl.
| | |
|---|---|
| *C09K 8/06* | (2006.01) |
| *C09K 8/68* | (2006.01) |
| *C09K 8/42* | (2006.01) |
| *C09K 8/60* | (2006.01) |
| *E21B 41/02* | (2006.01) |

(52) U.S. Cl. ........ 507/105; 507/203; 507/208; 507/261; 166/244.1

(58) Field of Classification Search ............... 507/203, 507/208, 261, 105; 166/244.1
See application file for complete search history.

(56) References Cited

U.S. PATENT DOCUMENTS

| | | | | |
|---|---|---|---|---|
| 2,765,851 | A | * 10/1956 | Bond | .......... 166/305.1 |
| 2,898,294 | A | 6/1959 | Priest et al. | |
| 4,148,360 | A | * 4/1979 | Watanabe | .......... 166/300 |
| 4,900,456 | A | 2/1990 | Ogilvy | |
| 4,990,283 | A | 2/1991 | Visca et al. | |
| 5,125,978 | A | * 6/1992 | Flynn et al. | .......... 134/2 |
| 5,698,138 | A | * 12/1997 | Visca et al. | .......... 516/22 |
| 6,149,980 | A | * 11/2000 | Behr et al. | .......... 427/388.1 |

OTHER PUBLICATIONS

3M Fluorinert Product information sheet, 2003.*
Handbook of Chemistry and Physics, 91st edition, 2010-2011, section 3 (CRC).*
3 M fluorinert Prodcut information sheet, 2003.*
CRC Handbook of Chemistry and Physics, 91st edition, section 3-154.*

* cited by examiner

*Primary Examiner* — Ling Choi
*Assistant Examiner* — Aiqun Li
(74) *Attorney, Agent, or Firm* — Antonelli, Terry, Stout & Kraus, LLP.

(57) ABSTRACT

The present invention relates to a well drilling, completion or workover fluid wherein the continuous phase of the fluid essentially consists of a liquid fluorinated compound. In a variant, the liquid fluorinated compound is a perfluorinated compound.

17 Claims, No Drawings

WELL FLUID COMPRISING A FLUORINATED LIQUID PHASE

CROSS-REFERENCE TO RELATED APPLICATION

This application is a continuation application of U.S. application Ser. No. 11/561,094, filed Nov. 17, 2006 now U.S. Pat. No. 7,858,564, the contents of which are incorporated herein by reference.

FIELD OF THE INVENTION

The present invention relates to a fluid of optimized composition intended to solve problems encountered during operations such as drilling, completion or workover operations in a well.

What is referred to as completion is all the preparation or outfitting operations required for bringing in a geologic formation from the wellbore. These completion operations use particular fluids called completion fluids.

What is referred to as workover is all the operations carried out in a producing or potentially producing well. Workover fluids can be used in the producing well in circulation in a comparable manner to drilling fluids, or in form of a spacer fluid.

A feature that all these drilling, completion or workover fluids have in common is the physico-chemical suitability of their formulation to the nature of the geologic formations they are in contact with and to the main functions they are intended for. In fact, it is well known that the fluids used in a well generally have most of the following functions:
  well walls stability maintenance,
  controlled filtration in permeable formations,
  good capacity for cleaning the bottom of the well in circulation,
  easy density adjustment,
  stability in temperature and in time,
  no or little contamination by clays or electrolytes,
  easy manufacture and treatment, etc.

To obtain these complex combined functions, that can be incompatible, the relative amounts of additives suited to the desired functions within the context of the well constraints have to be selected and adjusted. Thus, depending on the nature of the geologic formation problems encountered, of their bottomhole conditions, such as pressure and temperature, and according to the main functions essential for the fluid, the composition of the well fluid is generally the result of a compromise between several functions and the cost of the essential additives.

BACKGROUND OF THE INVENTION

The main problems encountered when using fluids under HP/HT (high pressure/high temperature) conditions are essentially due to the following two constraints:
  a well fluid density above 2000 kg/m$^3$ is required in order to balance the bottomhole pressure at great well depths,
  the bottomhole static pressures are often much higher than 200° C. and they can sometimes reach or even exceed 300° C.

The drilling techniques commonly used under less drastic conditions (less deep reservoir and/or temperature less than or equal to 200° C.) utilize water-base fluids or oil-base fluids. In the latter case, the continuous phase generally consists of a hydrocarbon of diesel or isoparaffin type. The density of the fluid is then adjusted by adding dense salts soluble in aqueous phases (barium chloride, alkaline formates, . . . ), and also by adding mineral fillers dispersed in the continuous phase. The dispersion stability is generally provided by various types of suspending, thinning, wetting agents, polymers.

The fluids currently known are ill-suited to HP/HT conditions, in particular above 220° C. The main problem of current muds under HP/HT conditions is thus when drilling is stopped. After an extended period of time in the well bottom, a strongly marked particle settling phenomenon, notably weighting material, appears. In some cases, a solid mass that cannot be recirculated forms. The well is then plugged.

This phenomenon is linked to the high mineral filler concentration in the fluid formulation, which is necessary to densify the mud, and to the settling acceleration due to the loss of the rheological properties of the fluid. The loss of rheological properties is notably due to the thermal degradation of the various additives the mud is made up of, notably the suspending agents (such as clays, polymers, surfactants). As regards hardening of the deposit, gelling of the clays under the effect of temperature is probably involved.

For water-base fluids, hydrosoluble polymers are used as viscosifiers for the continuous phase. They are of polysaccharide type, such as xanthan derivatives or others, or synthetic polymers, vinyl copolymers or terpolymers, based on acrylamide and comprising at least one of the following monomer units: acrylate, acrylamidomethyl propane sulfonate (AMPS), itaconate, styrene sulfonate. The limit temperature of use for this type of polymer rarely exceeds 200° C. The following documents can be mentioned by way of reference: Y. M. Wu, B. Q. Zhang, T. Wu, C. G. Zhang: *Colloid Polym. Science* 27 (9) 836-84 (2001); A. Audibert, L. Rousseau, J. Kieffer, SPE 50724, (1999); Y. M. Wu, D. J. Sun, B. Q. Zhang, C H. G. Zhang: *J. Appl. Polym. Sci.*, 83, 3068-3075 (2002).

The mineral fillers can also be suspended by adding to the formulation dispersing polymers that are also limited to a similar temperature range.

In the case of non aqueous fluids, notably fluids comprising isoparaffins as the continuous phase, the formulation is more complex. They are reverse water-in-oil emulsions whose continuous phase density is about 900 kg/m$^3$. When the density of the fluid is necessarily high (density greater than or equal to 2000 kg/m$^3$), the volume fraction of fillers incorporated in the fluid can exceed 35%. The stability of these formulations is linked with the stability of the emulsions at high temperature and, then again, it is very difficult to formulate stable fluids at temperatures above 220° C. The risk involved is then a phase separation that causes degradation of the rheological properties, encroachment of the formations and settling of the weighting agents (P. D. Scott, M. Zamora, C. Aldea, *IADC/SPE Drilling Conference*, 2-4 March, Dallas, Tex.—D. J. Oakley, et al. *IADC/SPE Asia Pacific Drilling Technology*, 11-13 September, Kuala Lumpur, Malaysia). The deposits can be plentiful and gel after some ten hours under the effect of temperature.

The present invention relates to well fluids comprising dense liquids stable at high temperatures, which are the main constituents of the continuous phase. The invention more particularly relates to well fluids whose continuous phase comprises a fluorinated dense liquid stable at high temperature. The preferred range of application of these fluids is generally under high pressure and high temperature conditions generally encountered during drilling or development of very deep-seated geologic reservoirs, i.e. more than 3000 m, generally more than 5000 m in depth.

SUMMARY OF THE INVENTION

The object of the present invention thus consists in using a liquid fluorinated compound as the main constituent of the continuous phase of well fluids for at least two essential properties of these products:

their high density, their temperature resistance.

The fluorinated liquid compounds concerned by the invention can contain or not other functional groups, for example: other halogenated groups other than fluorinated, or hydrocarbon-containing groups. The well fluid according to the invention can contain more specifically perfluorinated liquids as the fluorinated liquid, more specifically perfluoropolyalkylethers and their derivatives.

The perfluoropolyalkylether family (also referred to as perfluoropolyethers or PFPE) is notably an advantageous variant. PFPEs are a single class of fluorinated polymers that are liquid at ambient temperature and have particular characteristics such as low interfacial energy, high lubricating power, very high thermal and chemical resistance, and low toxicity. Densities from 1800 kg/m³ to 2000 kg/m³ and thermal stabilities above 300° C. are obtained. Thus, perfluoropolyalkylethers (CAS No.: 60164-51-4) are commercial products and they are generally used as lubricants, as heat-carrier, as hydraulic fluid in the aerospace industry, as electrical insulant in electronics. The synthesis of PFPEs is described in the following article: W. C. Bunyard et al., *Macromolecules*, 32, 8224 (1999).

Examples of PFPE liquid are: Krytox® of the Dupont Company, Fomblin® of the Solvay Solexis Company, Demnum® of the Daikin Company.

The liquid compounds concerned by the invention can have the following characteristics:

the density of the liquid in question, measured at 20° C., can range between 1800 and 2200 kg/m³, the maximum temperature of use of these liquids can range between 220° C. and 400° C., a kinematic viscosity, measured at 20° C., ranging between 10 and 10000 cSt, more particularly between 10 and 2000 cSt. Their molar mass can range between 1000 and 30000 g/mol, preferably between 1000 and 10000 g/mol.

The perfluoropolyether compound according to the invention has at least one of the following structures, or mixtures thereof:

$$E-O-(CF(CF_3)CF_2O)_m(CFXO)_n-E' \quad (a)$$

where X is equal to F or $CF_3$;

E and E', equal or different from one another, are $CF_3$, $C_2F_5$, or $C_3F_7$;

m and n are integers such that the m/n ratio ranges between 20 and 1000 and the viscosity of the product is in the 10-4000 cSt range;

$$C_3F_7O-(CF(CF_3)CF_2O)_o-D \quad (b)$$

where D is equal to $C_2F_5$ or $C_3F_7$;

o is an integer such that the viscosity is in the range of structure (a);

$$\{C_3F_7O-(CF(CF_3)CF_2O)_p-CF(CF_3)-\}_2 \quad (c)$$

where p is an integer such that the viscosity is in the range of structure (a);

$$E-O-(CF(CF_3)CF_2O)_q(C_2F_4O)_r(CFX)_s-E' \quad (d)$$

where X, E and E' according to structure (a);

q, r and s are integers or zero numbers such that the viscosity is in the range of structure (a);

$$E-O-(C_2F_4O)_t(CF_2O)_u-E' \quad (e)$$

where E and E' according to structure (a);

t and u are integers such that the t/u ratio ranges between 0.1 and 5 and the viscosity is in the range of structure (a);

$$E-O-(CF_2CF_2CF_2O)_v-E' \quad (f)$$

where E and E' according to structure (a);

v is a number such that the viscosity is in the range of structure (a);

$$D-O-(CF_2CF_2O)_z-D' \quad (g)$$

where D and D', equal or different from one another, are $C_2F_5$ or $C_3F_7$;

z is an integer such that the viscosity is in the range of structure (a).

According to the invention, a well fluid formulation comprising said fluorinated liquid compounds is also optimized in order to stabilize the suspension of the solid fillers with emulsifiers and/or rheology modifiers. The well fluid is suited to withstand a massive brine inflow from the reservoir rock and it is therefore advantageously formulated in form of a reverse water emulsion in a continuous phase comprising the fluorinated liquid. This reverse emulsion can also contain other liquid phases, organic for example, which allows formulation stability to be ensured in case of hydrocarbon inflow. The emulsion can contain 5 to 40% by volume of a dispersed brine aqueous phase. The brines can consist of sodium, potassium or calcium chlorides, sodium or potassium carbonates, alkaline formates. The well fluid can contain a mixture of aqueous fluid and hydrocarbon liquid in emulsion in the fluorinated liquid.

Surfactants are used not only to stabilize the emulsion, but also to disperse the mineral fillers (weighting agent and possibly clays or organophilic clays) and thus to control the rheological properties of the fluid, in particular the thixotropy. The emulsifying system used allows emulsion stability to be obtained over a wide temperature range.

The surfactants used here are selected so as to be compatible with the continuous phase, in particular as regards the fluorinated chemical nature of this phase. Documents U.S. Pat. No. 5,368,847, U.S. Pat. No. 4,990,283 and US-20,040, 086,650 describe fluorinated surfactants for various formulation types.

The surfactants described hereafter are appropriate to be compatible (i.e. soluble or dispersible) with perfluoropolyether.

The surfactants that are useful for the application affect one or more of the following properties: surface tension, capacity for wetting solid particles and notably those of the weighting material used (barite, carbonates or others), and/or HLB of the composition. By using surfactant mixtures, it is also possible to stabilize multiphase systems consisting of at least one perfluorinated liquid phase and at least one of the following phases: solid phase, aqueous phase, hydrocarbon-containing oil phase.

The fluorinated surfactants that are the object of the present invention can be ionic or non-ionic. The following can be mentioned in particular:

(a) perfluorocarboxylic acids containing 5 to 11 carbon atoms, and their salts, (b) perfluorosulfonic acids containing 5 to 11 carbon atoms, and their salts, (c) perfluorophosphates containing 5 to 11 carbon atoms, (d) non-ionic surfactants such as the compounds meeting the general formula $Rf(CH_2)(OC_2H_4)_nOH$, wherein Rf is a partly hydrogenated perfluorocarbon or fluorocarbon chain, n is an integer at least equal to 1, (e) fluorinated non-ionic surfactants of polyoxyethylene fluoroalkylether type, (f) mono and dicarboxylic acids deriving from perfluoropolyethers, and their salts, (g) mono and disulfonic acids deriving from perfluoropolyethers, and their salts, (h) perfluoropolyether phosphates, perfluoropolyether diphosphates, particularly efficient for dispersion of the mineral fillers, (i) perfluorinated cationic or anionic surfactants or those deriving from perfluoropolyethers having 1, 2 or 3 hydrophobic side chains, (j) ethoxylated fluoroalcohols, fluorinated sulfonamides or fluorinated carboxamides.

The formulations are constituted according to the final density of the fluid to be used, according to the density of the weighting material, and according to the mass fraction and to the density of the brine.

The two tables hereafter show non limitative formulation examples based on the production of a well fluid whose density, measured at 20° C., is 2200 kg/m³.

For a PFPE, with barite and a saturated $CaCl_2$ type brine: Table 1 (for 1 m³ fluid).

| Water mass fraction | Fluorinated liquid mass kg | Barite mass kg | Brine mass kg | Volume fractions | | |
|---|---|---|---|---|---|---|
| | | | | Fluorinated liquid | Barite | Brine |
| 0.00 | 1679 | 520.9 | 0.0 | 88% | 12% | 0% |
| 0.05 | 1501 | 589.1 | 110.0 | 79% | 13% | 8% |
| 0.10 | 1323 | 657.4 | 220.0 | 70% | 15% | 16% |
| 0.15 | 1144 | 725.6 | 330.0 | 60% | 16% | 24% |
| 0.20 | 966 | 793.8 | 440.0 | 51% | 18% | 31% |
| 0.25 | 788 | 862.0 | 550.0 | 41% | 19% | 39% |
| 0.30 | 610 | 930.2 | 660.0 | 32% | 21% | 47% |
| 0.35 | 432 | 998.4 | 770.0 | 23% | 22% | 55% |
| 0.40 | 253 | 1066.7 | 880.0 | 13% | 24% | 63% |

For a PFPE, with calcium carbonate and a saturated $CaCl_2$ type brine: Table 2 (for 1 m³ fluid).

| Water mass fraction | Fluorinated liquid mass kg | Calcium carbonate mass kg | Brine mass kg | Volume fractions | | |
|---|---|---|---|---|---|---|
| | | | | Fluorinated liquid | Calcium carbonate | Brine |
| 0.00 | 1347 | 853.4 | 0.0 | 71% | 29% | 0% |
| 0.05 | 1125 | 965.2 | 110.0 | 59% | 33% | 8% |
| 0.10 | 903 | 1076.9 | 220.0 | 48% | 37% | 16% |
| 0.15 | 681 | 1188.7 | 330.0 | 36% | 41% | 24% |
| 0.20 | 460 | 1300.4 | 440.0 | 24% | 44% | 31% |
| 0.22 | 371 | 1345.1 | 484.0 | 20% | 46% | 35% |

These formulation examples for a dense fluid show that the use of PFPE allows the amount of weighting material to be limited. It is clear that, in conventional cases of water-base or oil-base fluids, the volume fraction of weighting material is necessarily greater to reach the same density.

The invention claimed is:

1. A well drilling, completion or workover fluid characterized in that the continuous phase of said fluid mainly comprises a liquid fluorinated compound, an amount of an aqueous fluid in water emulsion in said liquid fluorinated compound, and the fluid is stable above 200° C., wherein said aqueous fluid is a brine of sodium, potassium or calcium chlorides, of sodium or potassium carbonates, or of alkaline formates.

2. A fluid as claimed in claim 1, wherein said liquid fluorinated compound is a perfluorinated compound.

3. A fluid as claimed in claim 1, wherein said liquid fluorinated compound comprises at least one perfluorinated group and at least one halogenated group other than fluorinated, or a hydrocarbon-containing group.

4. A fluid as claimed in claim 1, wherein said liquid fluorinated compound comprises a perfluoropolyether.

5. A fluid as claimed in claim 1, wherein said liquid fluorinated compound has a density, determined at 20° C., ranging between 1800 and 2200 kg/m3.

6. A fluid as claimed in claim 1, wherein said liquid fluorinated compound has a viscosity, determined at 20° C., ranging between 10 and 10000 cSt.

7. A fluid as claimed in claim 1, wherein said liquid fluorinated compound has a molecular mass ranging between 1000 and 30000 g/mol.

8. A fluid as claimed in claim 1, wherein said liquid fluorinated compound comprises a perfluoropolyether having at least one of the following structures, or mixtures thereof:

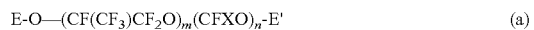
$$E\text{-}O\text{---}(CF(CF_3)CF_2O)_m(CFXO)_n\text{-}E' \quad (a)$$

where X is equal to F or $CF_3$;
E and E', equal or different from one another, are $CF_3$, $C_2F_5$, or $C_3F_7$;
m and n are integers such that the m/n ratio ranges between 20 and 1000 and the viscosity of the product is in the 10-4000 cSt range;

$$C_3F_7O\text{---}(CF(CF_3)CF_2O)_o\text{-}D \quad (b)$$

where D is equal to $C_2F_5$ or $C_3F_7$;
o is an integer such that the viscosity of the product is in the 10-4000 cSt range;

$$\{C_3F_7O\text{---}(CF(CF_3)CF_2O)_p\text{---}CF(CF_3)\text{---}\}_2 \quad (c)$$

where p is an integer such that the viscosity of the product is in the 10-4000 cSt range;

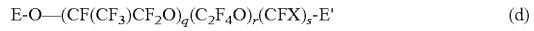
$$E\text{-}O\text{---}(CF(CF_3)CF_2O)_q(C_2F_4O)_r(CFX)_s\text{-}E' \quad (d)$$

where X is equal to F or $CF_3$;
E and E', equal or different from one another, are $CF_3$, $C_2F_5$, or $C_3F_7$;
q, r and s are integers or zero numbers such that the viscosity of the product is in the 10-4000 cSt range;

$$E\text{-}O\text{---}(C_2F_4O)_t(CF_2O)_u\text{-}E' \quad (e)$$

where E and E', equal or different from one another, are $CF_3$, $C_2F_5$, or $C_3F_7$;
t and u are integers such that the t/u ratio ranges between 0.1 and 5 and the viscosity of the product is in the 10-4000 cSt range;

$$E\text{-}O\text{---}(CF_2CF_2CF_2O)_v\text{-}E' \quad (f)$$

where E and E', equal or different from one another, are $CF_3$, $C_2F_5$, or $C_3F_7$;
v is a number such that the viscosity of the product is in the 10-4000 cSt range; and

$$D\text{-}O\text{---}(CF_2CF_2O)_z\text{-}D' \quad (g)$$

where D and D', equal or different from one another, are $C_2F_5$ or $C_3F_7$; and
z is an integer such that the viscosity of the product is in the 10-4000 cSt range.

9. A fluid as claimed in claim 1, comprising a useful amount of at least one surfactant, or mixtures thereof, selected from the following group:
(a) perfluorocarboxylic acids containing 5 to 11 carbon atoms, and their salts,
(b) perfluorosulfonic acids containing 5 to 11 carbon atoms, and their salts,
(c) perfluorophosphates containing 5 to 11 carbon atoms, (d) non-ionic surfactants such as the compounds meeting the general formula Rf(CH$_2$)(OC$_2$H$_4$)$_n$OH, wherein Rf is a partly hydrogenated perfluorocarbon or fluorocarbon chain, n is an integer at least equal to 1,
(e) fluorinated non-ionic surfactants of polyoxyethylene fluoroalkylether type,
(f) mono and dicarboxylic acids deriving from perfluoropolyethers, and their salts,
(g) mono and disulfonic acids deriving from perfluoropolyethers, and their salts,
(h) perfluoropolyether phosphates, perfluoropolyether diphosphates, particularly efficient for dispersion of mineral fillers,
(i) perfluorinated cationic or anionic surfactants or those deriving from perfluoropolyethers having 1, 2 or 3 hydrophobic side chains,
(j) ethoxylated fluoroalcohols, fluorinated sulfonamides or fluorinated carboxamides.

10. A fluid as claimed in claim 1, wherein said emulsion is stabilized by adding one or more surfactants, or mixtures thereof, selected from the following group:
(a) perfluorocarboxylic acids containing 5 to 11 carbon atoms, and their salts,
(b) perfluorosulfonic acids containing 5 to 11 carbon atoms, and their salts,
(c) perfluorophosphates containing 5 to 11 carbon atoms,
(d) non-ionic surfactants such as the compounds meeting the general formula Rf(CH$_2$)(OC$_2$H$_4$)$_n$OH, wherein Rf is a partly hydrogenated perfluorocarbon or fluorocarbon chain, n is an integer at least equal to 1,
(e) fluorinated non-ionic surfactants of polyoxyethylene fluoroalkylether type,
(f) mono and dicarboxylic acids deriving from perfluoropolyethers, and their salts,
(g) mono and disulfonic acids deriving from perfluoropolyethers, and their salts,
(h) perfluoropolyether phosphates, perfluoropolyether diphosphates, particularly efficient for dispersion of mineral fillers,
(i) perfluorinated cationic or anionic surfactants or those deriving from perfluoropolyethers having 1, 2 or 3 hydrophobic side chains,
(j) ethoxylated fluoroalcohols, fluorinated sulfonamides or fluorinated carboxamides.

11. A fluid as claimed in claim 1, comprising an amount of a hydrocarbon-containing liquid in water emulsion in said liquid fluorinated compound.

12. A fluid as claimed in claim 1, further comprising at least one additive selected from the group consisting of mineral fillers, surfactants, and rheology modifiers.

13. A fluid as claimed in claim 8, further comprising at least one additive selected from the group consisting of mineral fillers, surfactants, and rheology modifiers.

14. A fluid as claimed in claim 10, further comprising at least one additive selected from the group consisting of mineral fillers and rheology modifiers.

15. A fluid as claimed in claim 1, wherein the fluids remain stable up to temperatures between 220° C. to 400° C.

16. A fluid as claimed in claim 8, wherein the fluids remain stable up to temperatures between 220° C. to 400° C.

17. A fluid as claimed in claim 10, wherein the fluids remain stable up to temperatures between 220° C. to 400° C.

* * * * *